No. 625,762. Patented May 30, 1899.
T. HAYES.
MEANS FOR GAINING DRY FEED FROM DISTILLERY SLOP.
(Application filed June 24, 1897.)
(No Model.) 3 Sheets—Sheet 1.
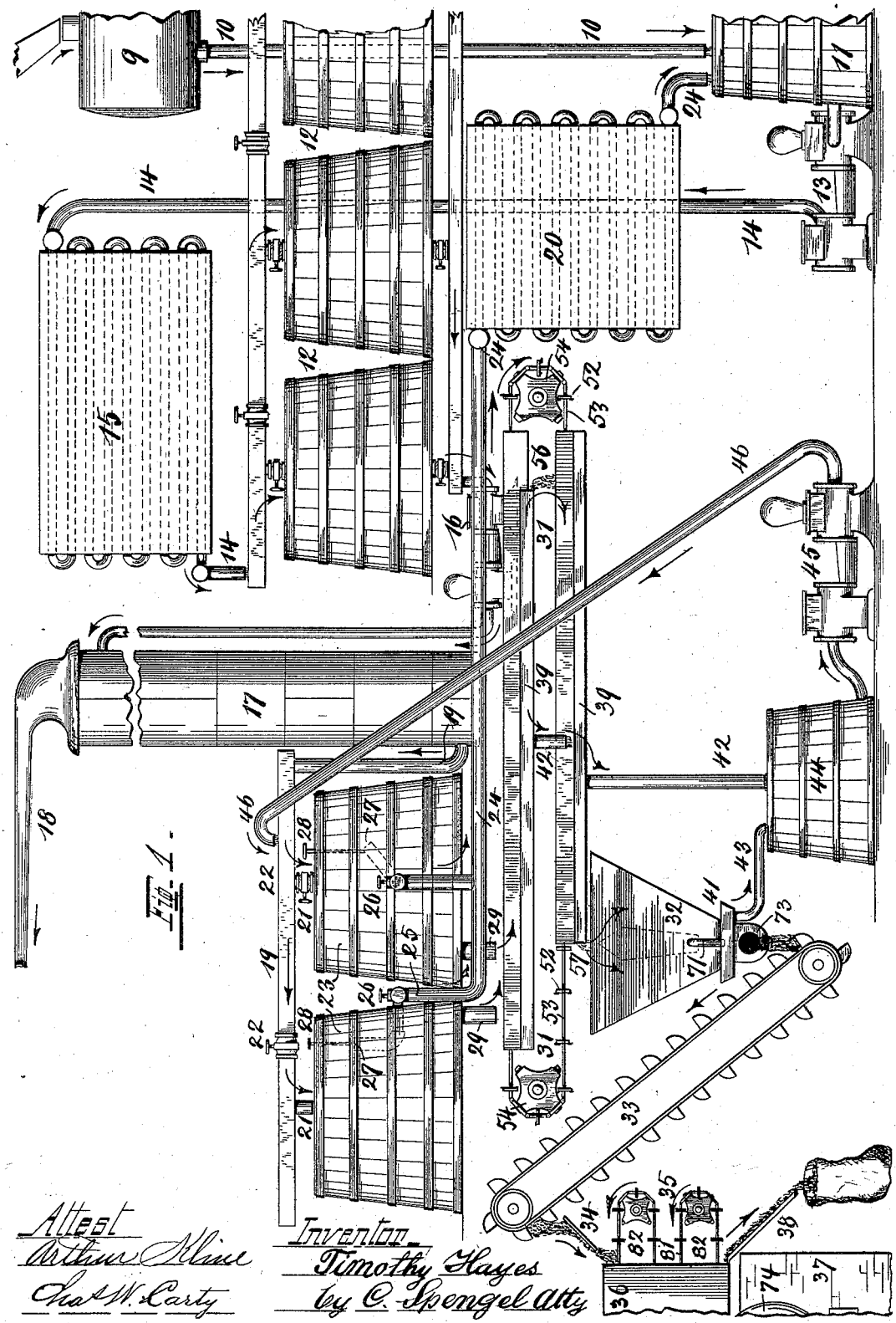

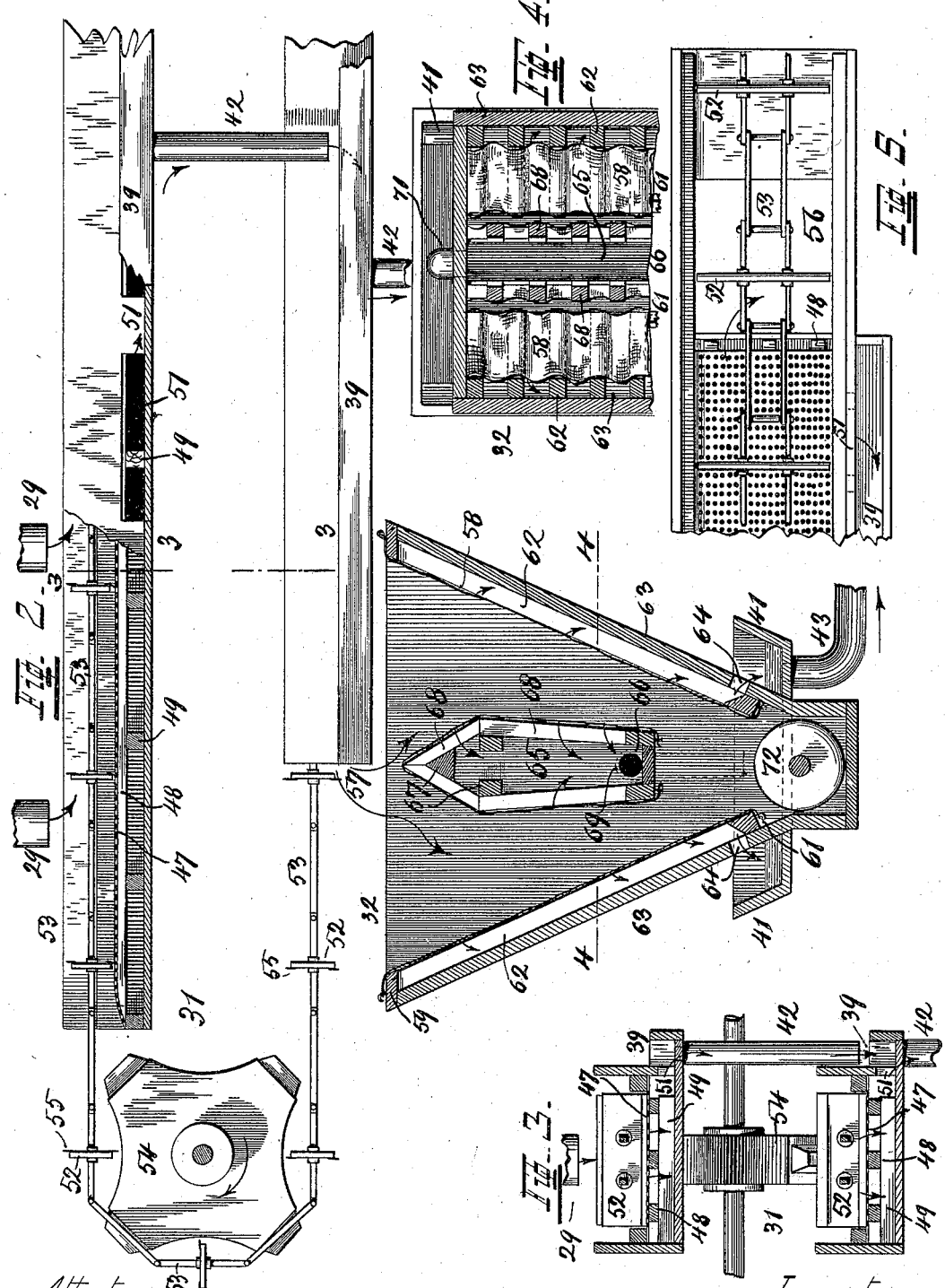

No. 625,762. Patented May 30, 1899.
T. HAYES.
MEANS FOR GAINING DRY FEED FROM DISTILLERY SLOP.
(Application filed June 24, 1897.)
(No Model.) 3 Sheets—Sheet 3.
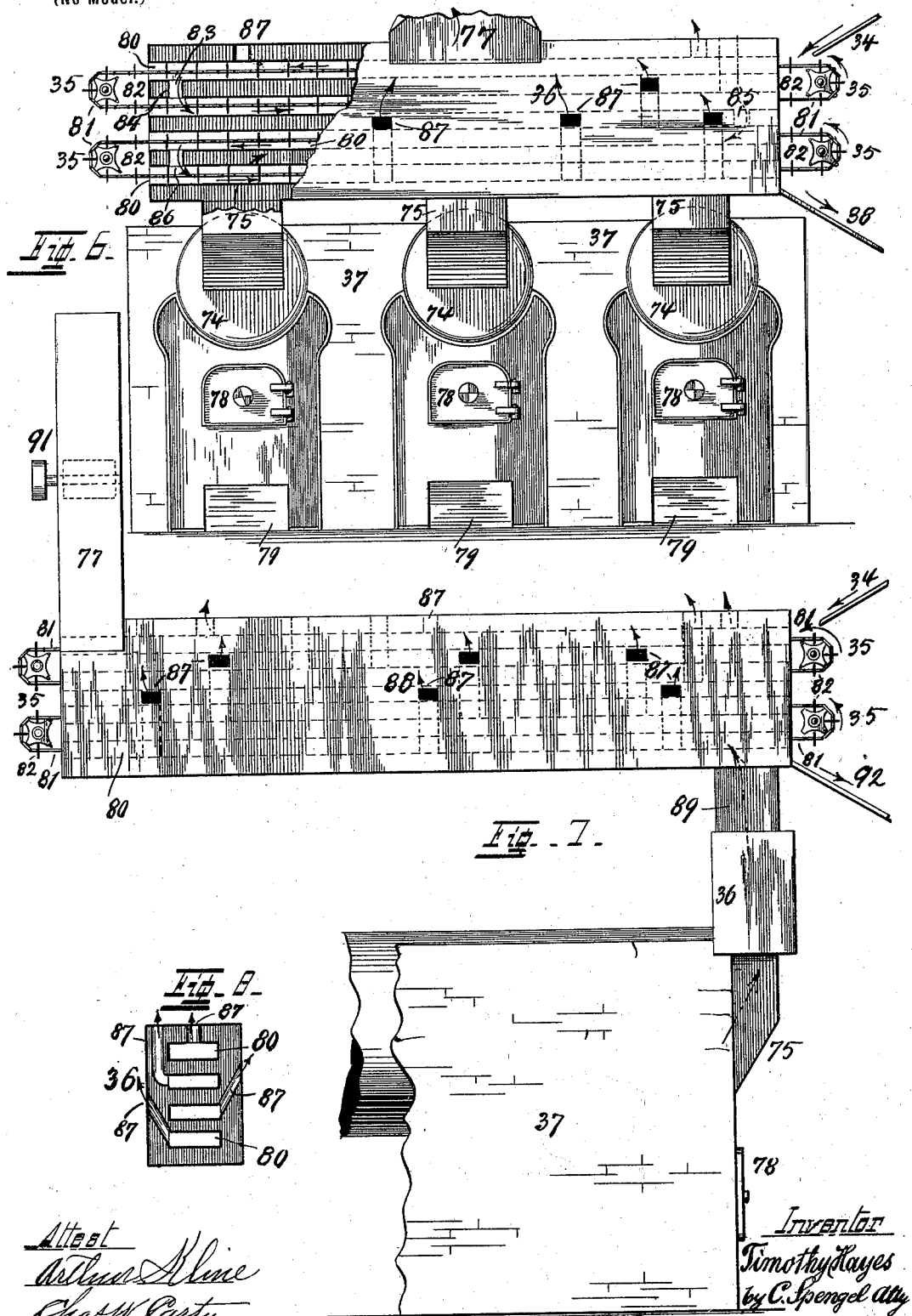

UNITED STATES PATENT OFFICE.

TIMOTHY HAYES, OF CINCINNATI, OHIO.

MEANS FOR GAINING DRY FEED FROM DISTILLERY-SLOP.

SPECIFICATION forming part of Letters Patent No. 625,762, dated May 30, 1899.

Application filed June 24, 1897. Serial No. 642,046. (No model.)

*To all whom it may concern:*

Be it known that I, TIMOTHY HAYES, a citizen of the United States, and a resident of Cincinnati, Hamilton county, State of Ohio, have invented certain new and useful Means for Gaining Dry Feed from Distillery-Slop; and I do declare the following to be a clear, full, and exact description of the invention, such as will enable others skilled in the art to which it appertains to make and use the same, attention being called to the accompanying drawings, with the reference-numerals marked thereon, which form a part of this specification.

This invention relates to means whereby the meal and solid substances contained in distillery-slop are first separated therefrom and then dried. By such slop is meant the liquid matter of differing consistence which discharges at the lower part of the beer-still, being one of the products of the distillation therein of the mash or beer. The latter enters the still for purposes of such distillation and during which the spirit-carrying vapors are generated, which escape at the top of the still to be reduced to high-wine, while the residue remaining after such separation constitutes the aforesaid slop, which leaves at the lower part of the still. This slop consists of water and meal from corn, grain, barley, &c., according to whatever material is being used in the still. These latter substances are highly nutritious and form valuable food matter suitable for domestic animals, particularly cattle, for which reason this slop is eagerly sought after for such purpose. Because of its liquid consistence its use is limited, however, on account of difficulty in handling and transportation, which has led to the establishment and connection with distilleries of so-called "cattle-pens," where the slop is fed directly to the animals. These pens are objectionable for many reasons well known to distillers, and particularly so when considered from a sanitary point of view. Many attempts have therefore been made to extend the use of this slop by rendering it available at places and times independent from the distilleries and the pens connected therewith. The problem presented by these attempts requires concentration by separating the water from the solid substances in order to obtain a dry feed which could be readily packed and shipped in bags or otherwise. This separation was sought to be obtained principally by way of either straining, filtration, pressure, or vaporization, but proved to be more or less a failure in all instances. As against straining and filtration the difficulty was a clogging of the material through which the slop was to pass and caused by the presence of certain gummy and glutenous substances which develop, apparently, in the still. If pressure was added, which squashed the larger particles, this clogging was simply increased. Both in filtering and pressure and similar mechanical processes the liquid which is taken from the solid substances carries away the finer particles of meal and flour, which as a matter of fact are really the most valuable part of the slop, since they contain and constitute the better and purer part of the food products. Only the coarser and more fiber-containing parts were then retained, resulting finally in the production of a very poor grade of feed of limited value as a nutrient. As against vaporization—that is, driving away the water by heat directly applied—the objection was that the slop would bake and crust on the apparatus which contained it, thus becoming difficult to be removed, besides requiring too extensive an area of surface to take care of all the slop produced, especially in larger distilleries. In most all of the instances mentioned the cost of the mechanical appliances used, together with expense of labor required to operate them and the unsatisfactory limited yield, increased the expense for producing this feed to such a figure as to preclude the manufacture of it sufficiently cheap to be marketable at a profit. Recognizing these difficulties, my aim was to devise means which separate the water from the feed in a manner to preclude any and all waste, particularly of the finer and more nutritious particles, which now in most cases float away with the water, and which dispenses with any apparatus and devices too delicate and complicated for the purpose, using instead such means which to a large extent can be left to themselves for operation, thereby reducing also the attendant labor necessary and cost connected therewith.

In the modern operation of distilleries the thinner part of the slop is returned again to the fermenting-tubs, either to be added to the mash in place of water or to take the place of the latter altogether, such being considered preferable for reasons which have no further bearing on the subject of this discourse. It is during this return of the slop from the beer-still that the separation therefrom of the solid substances has been attempted in most of the methods alluded to, so that only the thinner part should reach the fermenting-tubs; but these attempts have been successful only as far as the coarser and heavier particles were concerned and did not include the finer but more valuable particles which float with the water. The separation contemplated by me takes place also at this time—that is, while the discharged slop passes from the still to the fermenting-tubs or to whatever other point of final disposal in case it is not used for the latter.

My invention has in view two leading objects, of which the first contemplates the withdrawal from the slop discharged from the still or circulating between the latter and the fermenting-tubs of the solid particles thereof and having this separation, as to the inclusion of the finest floating particles, as complete as possible—that is, as to the water from the solids—to facilitate the later drying of the latter, and as to the solids from the water to prevent waste.

The other object relates to the finishing of the product so obtained by applying heat to it, whereby all water and moisture yet retained are finally driven off and the feed made ready to be ground and packed for shipping.

In attaining the first object my process relies principally on sedimentation to obtain the substances desired, and consists, substantially, of interposing a number of settling-vats within the above-mentioned circuit of the slop, enough of them being provided to hold the slop while in transit after discharge sufficiently long for the purpose without interrupting or interfering with the general operation of the distillery. In practice I obtain best results by leaving the slop contained in any one of the settling-vats undisturbed for about ten hours, after which time the thin liquid above is drawn from the top of the precipitated sediment and returned to the fermenting-tubs if to be used therein. I have further found that the settling capacity of any given plant should be about equal to two-thirds of the fermenting capacity, so that for three fermenting-tubs two settling-vats of about equal capacity may be provided. Assuming, then, such a condition, the slop from the still would first discharge into one vat and then into the other, so that by the time the second vat is nearly filled the contents of the first vat would have been settling for about ten hours and are ready to be emptied, which is done by drawing off the thin liquid from above, the thick sediment remaining, which latter is pushed out onto a conveyer and taken thereby to the drier. The thin liquid drawn off first is conducted back into the fermenting-tub or into a preliminary receiving-tank if not required at once. The vat so emptied is then ready for refilling and settling, while the contents of the other vat, which have been settling meanwhile, are similarly disposed of, so that one vat is always on hand for receiving slop and settling and one for furnishing thin slop to the fermenting-tubs. An important feature of this part of my process is that the separation of water from the thick matter while passing to the drier is still continued during this transit, so that the solids arrive at the drier with the least water possible.

It will be readily seen that there is no waste, since the slop is kept in constant circulation, passing within a closed circuit from the still back to the fermenting-tubs and again to the still, being repeatedly held at certain times during its transit for settling, so that substances which are not withdrawn at one time are surely withdrawn at one of the later times.

All waste during transport of the thick sediment to the drier is guarded against, and no loss takes place while it is in the latter, where the remaining moisture is only driven off.

The second object of my invention, which contemplates the finishing of the thick sediment so obtained by drying, consists of subjecting the same to the action of heat, whereby any moisture retained yet is expelled. While any approved drying apparatus may be used for this purpose, I prefer to use and have designed one in which waste heat, passing otherwise out of the smoke-stack, becomes available.

Most distilleries have connected with them boiler-furnaces which have suitable conduits, like flues, breechings, and smoke-stacks, for carrying off smoke and products of combustion. To obtain the use of the waste heat passing out with these latter, I provide passages which traverse heat and smoke conveying conduits—such as, for instance, breeching and smoke-stacks—and through which passages the sediment is conveyed, the construction and operation being in a manner to cause the said sediment to be subjected to the action of the heat without, however, coming in contact with the smoke. Since these drying-passages reduce the area and capacity of the smoke-conveyers to the extent of their size, it may be necessary to enlarge the latter correspondingly.

Instead of using any of the usual smoke-conveyers mentioned I may also construct smoke-conveyers specially adapted for the two purposes combined—that is, for carrying off the smoke from the furnaces and at the same time serving to dry the wet sediment; but in either case I propose to use only the waste heat passing from the furnaces.

It is now plain that a process as thus outlined requires no delicate machinery nor very much attendance, since for a considerable part of the time it may be left to itself. The result is a feed product of excellent and rich quality, which may be readily shipped and becomes available without the use of the objectionable cattle-feeding pens. Manufactured under my process it may be obtained so cheaply as to yield a handsome profit to the distiller and produces an additional source of revenue by saving for useful purposes valuable food matter which hitherto on account of limited use had largely gone to waste. Incidentally the feed so produced is more wholesome, since the heat during the drying process expels and neutralizes objectionable matter which would remain otherwise and which is present when the food is consumed in the liquid state of slop.

I will proceed now to describe more in detail my invention in connection with necessary devices and as applied in a given case, reference being had to the accompanying drawings, in which—

Figure 1 is a diagram of a part of a distillery, showing parts in elevation. Fig. 2 shows in an enlarged side view, partly in section, the sediment-conveyer 31 with hopper 32 in their respective positions. Figs. 3 and 4 are sections on lines, respectively, 3 3 and 4 4 of Fig. 2. Fig. 5 shows a top view of conveyer 31 near the right-hand end of the same. Fig. 6 shows in a front elevation of a battery of boilers the application of some parts of the same for use as a drier for my purposes. Fig. 7 is a side elevation of part of a boiler-furnace, showing a modified construction of my drier in connection therewith; and Fig. 8 is a vertical cross-section through those parts of a boiler-furnace which are used as a drier.

9 is the mash-tank, in which the mash is prepared and from which it discharges through a pipe 10 into a receiver 11, from which the fermenting-tubs 12 are supplied. This receiver is drawn on whenever required, a pump 13 being used to lift the mash through a pipe 14 to a cooler 15, through which it passes before reaching the fermenting-tubs. Leaving the latter in a condition called "beer," now it is raised by another pump 16 to the beer-still 17, wherein under the influence of heat, usually by steam, the well-known process of distillation takes place, which results in the separation of the spirit-vapors, which pass out at the top of the still through a pipe 18 to be condensed and changed into high-wine, while the other product of distillation discharges through a pipe 19 in the form of slop. Pipe 19 has two outlets 21 21 and is controlled by valves 22 22 in a manner that either one of the settling-vats 23 23 may be used for receiving and settling slop while the other vat is being emptied of its contents. After standing the required number of hours, sufficient to permit all or most of the thinner particles of meal and flour floating in the liquid to settle, the latter is carefully drawn off from the top of the sediment, passing out through a pipe 24, which has branches 25 and valves 26, so that either vat may be emptied independently. This drawing off may be by gravity if location and position permit such, or a pump may be used if necessary. The ulterior object is to have the withdrawn thin liquid to reënter the still with the mash, and it joins the latter in or preferably before reaching the fermenting-tubs. As shown, pipe 24, passing through a cooler 20, first discharges into receiver 11, where it joins the mash and becomes again a part of the latter, passing with it through cooler 15 and fermenting-tubs 12 to the still. The thin liquid becomes thus again a part of the beer and is subjected repeatedly to all the different manipulations, distillation, settling, &c., of the same, so that a given quantity of slop remains for a long time in circulation and is repeatedly held for settling, whereby in the end practically all the finer particles of meal and flour are withdrawn.

The inner end of each outlet-pipe 25 is adjustable in such a manner that the receiving-mouths 27 within vats 23 may be raised or lowered, being manipulated by a rope or rod 28, so as to follow the receding level of the discharging liquid, but taking the same always and only from at or near the surface, thereby preventing disturbance of the sediment. This also enables the attendant to observe the condition of the liquid passing off, so that he may stop the outflow in proper time and before the sediment is disturbed when the thicker stratum of the same is reached. The particular level of this stratum is not at all times and conditions at exactly the same height, but may by means of this adjustable outlet-opening be readily reached, so that in each case all the thin part may be drawn off without any of the sediment no matter where the dividing-line between the two strata may be at the time. After this by means of a gate valve or plug outlet-openings 29 in the bottom of the vats are opened and the thick sediment is pushed out and onto the upper branch of a conveyer 31, from which it drops upon the lower branch of the same and on which it is taken to a hopper 32, from whence by an elevator 33 it is fed over a chute 34 onto conveyers 35, which take it to and through the drier 36. This latter in this case is assumed to be the breeching of a boiler-furnace 37, the waste heat of the smoke and products of combustion being only used. Leaving the drier at 38 the product, unless it is desirable that it be ground first, is then finished and ready for use as feed, being usually packed and shipped in bags for the market. The thick matter discharged from vats 23 until immediately before it enters the drier is still given a chance to free itself from any liquid which may drain therefrom and for which purpose the trough of conveyer 31 and walls of hopper 32 are perforated to give an outlet to such liquid. Drain-gutters 39 and 41 are provided, which receive this liquid and discharge the same through pipes 42 and 43 into a collector 44, from which by a pump 45 this drainage is raised through a pipe 46 up to the slop-pipe 19, joining again the slop going to the vats for settling. It will thus be seen that also at this part of the process the watery liquid circulates within a closed circuit similar to the closed circuit whereby the thin slop from the vats is returned to the fermenting-tubs, so that by reason of these two closed circulating transits all waste of matter is avoided. Excepted are of course such times when there should be an excess of this slop for the fermenting-tubs or an excess of feed on hand, which latter exigency practically never occurs, but in which case either may be wasted in any suitable manner.

The number of the settling-vats depends on the capacity of the distillery and should be such as to be capable of handling all the slop produced in the manner stated—that is, by giving it sufficient time to settle before it reaches the fermenting-tubs, but providing at the same time always a sufficient supply for the latter.

As to details of construction, the two branches of conveyer 31 consist, substantially, of two troughs, within which some distance above their bottoms another perforated bottom 47 is supported. This latter consists, preferably, of perforated sheet metal, and to prevent it from sagging is supported on longitudinal strips 48, which again rest on cross-ties 49, between which the drained-off water may flow out through openings 51 into the drain-gutters 39. The sediment discharged from outlets 29 drops onto this perforated bottom 47 of the upper branch and is immediately moved onward by paddles or sweepers 52, all connected to and operated by an endless chain 53, supported on guide-pulleys 54, one of which is power-driven, the power being derived from any suitable source. The edges of the paddles are preferably provided with rubber lips 55 to prevent wear and to obtain a cleaner sweeping action. Near the other end bottom 47 terminates and the bottom of the trough is left open, as shown at 56, where the sediment drops through onto the lower branch, where it is again taken hold of by the paddles, their other edges coming into action now, and by which it is returned, moving again through the entire length of the conveyer, to be finally discharged at 57 into hopper 32. It will be observed that during all this time the separation between liquid and solids continues, the former draining off through the perforated bottoms 47 and collects in gutters 39, from which by spouts 42 it is conducted to receiver 44. This separation is still continued in hopper 32, which is provided with perforated walls 58, preferably constructed of bagging secured above and below to longitudinal strips 59 and 61 and supported between its edges on strips 62, running up and down. The outer walls 63 have larger outlet-openings 64, out of which the liquid seeping through the bagging 58 drains off into gutters 41, from which by spout 43 it is also carried to receiver 44. To make the drainage of the mass within the hopper more thorough, an internal drain 65 is provided, consisting of a framework covered also with bagging and with a gutter 66 below. The ends of the longitudinal timbers 67 of this framework and the ends of gutter 66 are supported on the ends of the hopper and carry between them the up-and-down timbers 68, which sustain the bagging. At the end of gutter 66 the ends of the hopper have openings 69, out of which the water seeping through the bagging drains off and is conducted then by a downspout 71 into gutter 41, where it joins the other drainage. The sediment practically devoid now of any free water is discharged from the lower contracted part of the hopper by any suitable means. A chain conveyer, like 31, or a screw conveyer may be used. The latter is assumed to be used and indicated at 72, the mass discharging at 73 onto elevator 33, which delivers it over chute 34 to the drier. It is evident that the manner of transmission from hopper to drier depends on the respective location of these parts and might be by any other means or by gravity alone should it occur that the hopper is above the drier. As mentioned before, I propose to use the waste heat from the boiler-furnaces which are connected with distilleries. The boiler-furnaces are usually arranged in batteries containing two or more boilers, the smoke from each furnace passing through flues into a breeching which is general for all and conducts the collected smoke to a stack. I propose to use for my purpose either the breeching, parts of the stack, a special structure interposed between breeching and stack, or all or two of these parts combined. If I use such a special structure, it forms virtually a part of the stack, and to the extent of its length the height of the latter may be shortened. Suitable conveyers and elevators are provided in each case, as may be required, to move the stuff through the parts used and from one part to the other.

I will describe now a selected construction where the breeching of a boiler-battery is used as a drier. Fig. 6 shows the front of such a battery of boiler-furnaces 37, 74 being the boilers and 75 flues from each leading to the breeching 36, which collects the smoke from all furnaces and delivers it to the stack 77. 78 are the fire-doors, and 79 the ash-pits, of each furnace. The breeching is traversed throughout its entire length by one or more pairs of passage-ways 80, open at both ends and completely closed against the interior of the breeching, but surrounded by the heat and smoke therein.

For each pair of passages there is provided a conveyer 35, consisting of an endless chain 81, carrying paddles or sweepers 82 and all supported and moved similarly as described for conveyer 31, the upper branches of the chain passing through the upper one of a pair of passages and the lower branch through the lower passage. The wet sediment is delivered by chute 34 onto the upper branch and moved through the upper passage. Near its other end an opening 83 is provided in the bottom of this passage and a connecting-spout 84, depending from it, which leads to the passage below, so that the stuff when arriving over opening 83 drops through into the passage below and is again taken hold of by the sweepers of the returning branch of the chain to be moved toward the other end.

If a second set of passages and conveyers is used, another spout 85 is provided to let the stuff through into the upper passage of the second set and from which through another spout 86 it finally reaches the lowest passage, from which, unless there be still another set, it discharges finished at 38. As shown, the stuff passes four times through the breeching and is four times subjected to the heat within the same. For each passageway flues 87 are provided, which communicate with the outer air and afford exit for steam and vapor driven off by the heat.

In Fig. 7 a special structure 88, which may be constructed of either iron or brick, is used and may be considered a part of the smoke outlet or stack, the smoke and heat passing into it from the breeching 36 though a flue 89, thence through 88 and out of the stack 77, which in this case may be considerably shorter. Draft may be induced or accelerated, if necessary, by a suction-fan 91. The interior of this structure is arranged exactly as described for breeching 36 and as shown in Figs. 6 and 8, having one or more pairs of passage-ways 80 traversed by conveyers and provided with spouts near their ends connecting them and leading to the passages below. Chute 34 is correspondingly arranged to deliver the stuff from hopper 32 to the uppermost passage, the discharge taking place at 92. Similar outlets 87 for vapor are also provided.

Instead of having the horizontal structure 88 and a short stack, a stack of usual height may be used with the passage-ways 80 vertical and conveyers with paddles or buckets suitably arranged for the purpose. Again, the breeching and structure 88 might be used combined, the stuff discharging at 38 being lifted by an elevator to reach the uppermost passage of structure 88. Whatever parts are used, whether breeching or smoke-stack, due allowance is made in the area of these parts for the space taken up by passage-ways 80, so as to prevent interference with the prime functions of these parts as smoke-outlets for the boiler-furnaces. While I have shown a certain way for performing and connecting the individual steps of this invention, I have done so only in connection with assumed conditions, and it is evident that the arrangement of the different parts, and particularly their manner of connection, depends largely on existing conditions in distilleries and location of parts therein and must be accordingly modified to suit each case. This applies particularly to the manner of transportation and transmission and temporary or entire omission of certain parts if found unnecessary. For instance, conveyer 31 or hopper 32, and particularly the former, might be dispensed with and the sediment discharged directly into the hopper, provided it could be obtained for the drier sufficiently free from water.

With certain possible modifications this invention may be readily adapted for use in breweries.

Of the parts described—such as mash-tank, fermenting-tubs, vats, still, coolers, pumps, boiler-furnaces, smoke-stacks, &c.—they may be of any approved style, and no novelty is claimed for any of them individually except as to the order and manner in which they are assembled, connected, and used. Excepted from this statement are the means for draining the stuff while in transit to the drier, the adaptation of existing parts for use as such drier, and all such matters as mentioned in the claims below.

Having described my invention, I claim as new—

1. The draining-conveyer 31, for receiving particles separated from distillery-slop and which consists of a perforated bottom and endless chain with sweepers for moving the mass over the same and gutters for receiving the drainage.

2. The draining-conveyer 31, for receiving particles separated from distillery-slop, and which consists of two troughs, one above the other, each with a perforated bottom within it, an endless chain with sweepers for moving over each of these perforated bottoms and an outlet near the end of the upper trough through which the mass discharges into the lower one.

3. The draining-hopper 32, having perforated sides some distance away from its outer walls, an outside gutter to receive the drainage, an outlet for the mass after drained, and means for moving it.

4. The drainage-hopper 32, having perforated sides some distance away from its outer walls, an outlet in its lower part for the mass after relieved of free liquid, an outside drainage-gutter 41, and an internal drain 65, with independent outlets.

5. The draining-hopper 32, having bagging, or similar material, stretched across the inside of its sides with a space between, outlet-openings 64, in the lower part of the hopper, a gutter to receive the drainage of these openings and an outlet-opening for the mass which has been drained.

6. A drier for drying separated particles from distillery-slop and similar matter, consisting of breechings of boiler-furnaces, or other heat-conveying conduits, of pairs of passage-ways traversing these conduits, sweepers operated by endless chains, one for each pair of such passage-ways occupying with its branches the two members of such pair, connections between the passage-ways near their ends through which the mass, after having traversed them, drops continually from upper passages into lower ones, and outlets 87, for the purpose described.

In testimony whereof I hereunto affix my signature in presence of two witnesses.

TIMOTHY HAYES.

Witnesses:
C. SPENGEL,
ARTHUR KLINE.